United States Patent [19]
Anderson

[11] Patent Number: 5,123,772
[45] Date of Patent: Jun. 23, 1992

[54] THREADED ASSEMBLY WITH LOCKING CAPABILITY

[75] Inventor: J. Hilbert Anderson, Spring Garden, Pa.

[73] Assignee: Coupling Corporation of America, York, Pa.

[21] Appl. No.: 684,804

[22] Filed: Apr. 15, 1991

[51] Int. Cl.$^5$ .............................................. B25G 3/20
[52] U.S. Cl. ..................... 403/374; 403/336; 403/368
[58] Field of Search ............. 403/374, 261, 373, 336, 403/368, 314

[56] References Cited
U.S. PATENT DOCUMENTS 3,129,038  4/1964  Benson ........................... 403/370 X

FOREIGN PATENT DOCUMENTS 451448  10/1927  Fed. Rep. of Germany ...... 403/314
3219746  1/1983  Fed. Rep. of Germany ...... 403/373
2137312  10/1984  United Kingdom .................. 403/15

Primary Examiner—Andrew V. Kundrat
Attorney, Agent, or Firm—Charles J. Long

[57] ABSTRACT

A threaded hub and shaft connection includes a first hub threaded onto a first section of the shaft using a thread shape having a working face rise angle of from 7 to 25 degrees. Preferably a second hub is threaded onto a second section of the shaft inboard of the first hub, and the threads in the second hub and second shaft section also have a working face rise angle of from 7 to 25 degrees. Bolts or set screws engage both of their hubs in such manner as to exert axial force on at least the first hub tending to move the first hub relative to the shaft in the working face rise direction of the thread carrying the first hub.

13 Claims, 3 Drawing Sheets

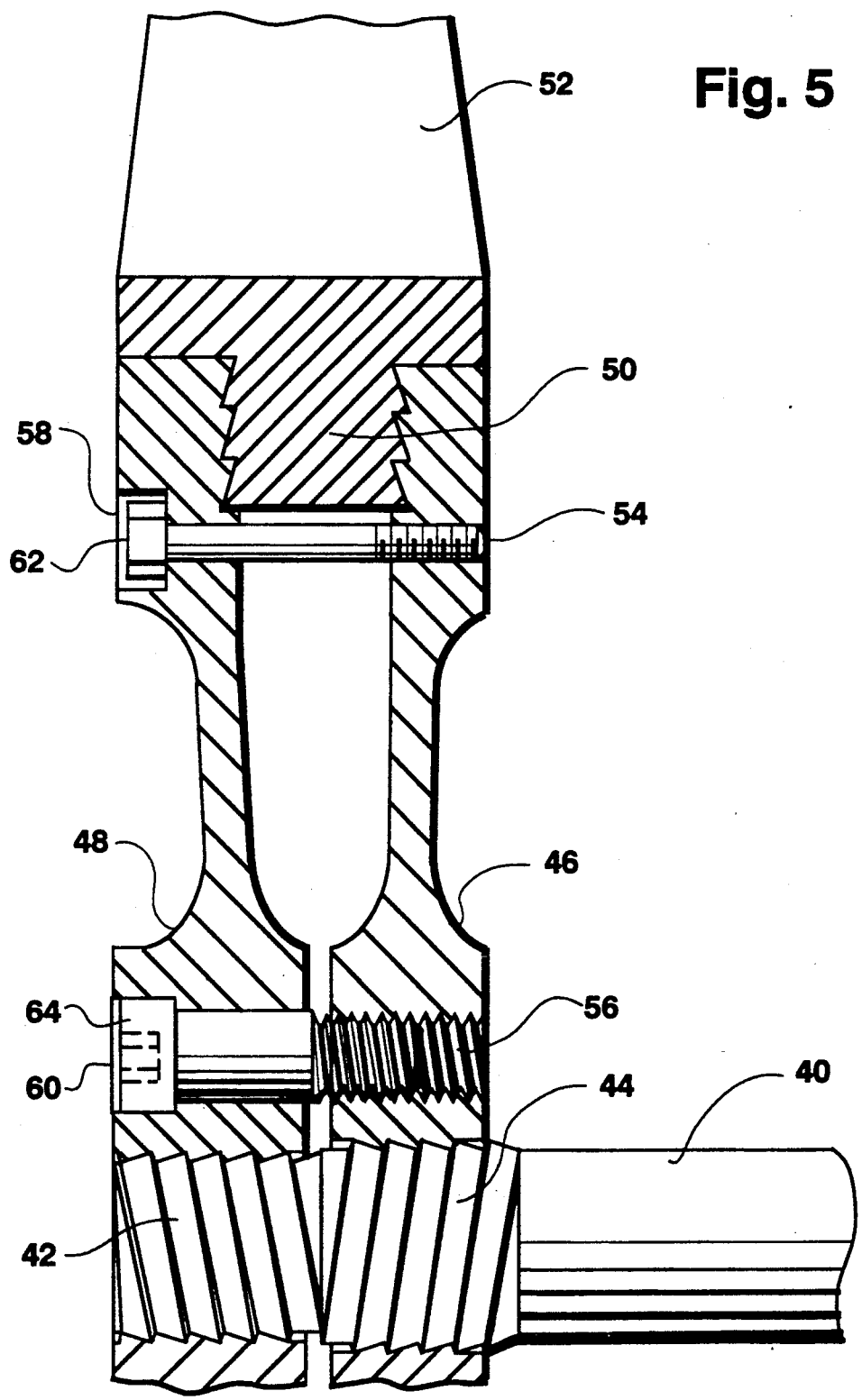

THREADED ASSEMBLY WITH LOCKING CAPABILITY

BACKGROUND OF THE INVENTION

1. Field of the Invention

This invention relates to assemblies for transmitting torque between a shaft and a hub or wheel mounted thereon. More particularly, the invention relates to such assemblies in which the hub or wheel is threaded onto the shaft and locking capability is attained through the provision of a unique thread shape. In its broader aspects, the invention relates to any assembly of a female member threaded onto a male member in which the members must be locked against rotation relative to each other.

2. Description of the Prior Art

Assemblies comprising a threaded cylindrical male member and a female member having a cylindrical bore threaded to match the threads in the male member are used for many applications in which it is desirable, and frequently critical, that under certain conditions the female member be locked against rotation with respect to the male member; in these applications, it is also frequently desirable that the "lock" be reversible to allow the members to be separated when necessary. A simple common example of such an assembly is that of a bolt and nut in which a lock washer between the nut and the surface to be held in place prevents loosening of the nut when the assembly is tightened.

In cases where torque is to be transmitted between a shaft and a hub or wheel mounted thereon, such as where a hub is mounted on the end of a driving shaft for connection through a flexible coupling to a similar hub mounted on the end of a driven shaft, or where a turbine wheel is mounted on a shaft, any of several attachment means have heretofore been used; however, each presents problems.

In the prior threaded shaft connection, which is seldom used, a threaded shaft end is screwed into a blind hole in a hub or wheel until it is tight against the bottom of the hole. This arrangement is sometimes useful, but can primarily transmit torque in only one direction; for example, if a right hand thread is used, the hub or wheel can be released if torque is applied in the left hand direction, a distinct disadvantage because reverse torques sometimes occur.

A straight keyed shaft connection comprises keyways cut into the shaft and into the side of the central hole of the hub or wheel; the keyways are radially aligned and a key is inserted to lock the hub or wheel to the shaft. In high speed and high torque applications where extremely tight fits are important, the required tightness is usually achieved by making the bore in the hub or wheel slightly smaller than the diameter of the shaft, expanding the hub or wheel by heating it, slipping it onto the shaft, and allowing it to cool, thereby resulting in a very tight interference fit on the shaft. This type of connection has several disadvantages. For one, the keyway cut into the shaft produces high stress concentrations which are aggravated with the use of heat for shrink fitting the hub or wheel on the shaft. The need for precise tolerances in the keyways makes manufacturing difficult and frequently time consuming. Where heat is used to produce a shrink fit, the torches or special heaters required can present a hazard depending on the environment in which the assembly is carried out.

Tapered key shaft hubs are used because by making a taper in the bore, a hub can be tightened on a shaft by pulling up on a nut threaded onto an extension of the shaft which protrudes past the hub. However, it is extremely difficult to get a tapered bore accurate and to match bores between shaft and hub, making this type of connection expensive and difficult. Further, a tapered shaft hub also has the disadvantage that stress concentrations can occur in the keyway, greatly reducing the effective strength of the connection.

Both types of keyed shaft connections generally require torch heating for removal.

A tapered shaft hydraulic connection is assembled by applying high hydraulic pressure in circumferential channels formed on the inside of a hub or wheel opening, thereby "stretching" the hub or wheel; when the hub or wheel is in place, the pressure is released, which effectively shrinks the hub or wheel on the shaft. While this system sometimes eliminates the need for a keyway, it transmits torque purely by friction, which can be unreliable. It also requires extreme accuracy in manufacturing the members of the connection and special hydraulic pumps, equipment and seals for assembly. This type of connection is very expensive and not often used.

Splined connections, in which a shaft and the opening in a hub or wheel are splined to mate when the hub or wheel is fitted on the shaft end, are sometimes used for connections of the type being discussed, but they are expensive to fabricate, since forming of the splines requires special high precision machinery.

In view of the foregoing, it can be seen that, especially in the field of shaft-mounted hubs and turbine wheels, a need exists for an improved connection assembly. Such an assembly should preferably include the following features:

1. It requires minimum skills and no special equipment to construct;
2. The hub can be mounted on the shaft without the need for high temperatures in heating equipment;
3. The assembly transmits maximum torque without creating high stress concentrations in the shaft;
4. The hub mounts symmetrically to the shaft centerline, particularly important in high speed machinery sensitive to unbalanced weight on the shaft;
5. The hub can be easily adjusted in axial position on the shaft;
6. The hub can be easily removed with simple tools and without heating;
7. The assembly parts can be easily manufactured—i.e., without excessively tight tolerances and with a minimum of required machinery setups; and
8. The assembly can transmit torque in either direction.

The foregoing and other advantages can be attained with the threaded assembly of my invention.

SUMMARY OF THE INVENTION

Preliminarily, in order to define certain of the terms used in this specification and the claims following, reference should be had to FIGS. 1 and 1a of the appended drawings, which illustrate a simplified and somewhat exaggerated partial cross-sectional view of a cylindrical shaft threaded in accordance with some embodiments of the invention. In FIG. 1, "A" identifies the axis of the shaft, measurement "OD" is the outside diameter of the shaft, and measurement "$D_R$" is the root diameter of the thread. "P" is the pitch, or distance between adjacent crests of the thread, a measure of thread fineness. The thread includes two faces; "WF" is the working face, i.e—the load bearing face, and "$F_2$" is the second face. Angle "a", between the working face and a line parallel to the axis, is the working face rise angle; similarly, angle "b", between the second face and a line parallel to the axis, is the second face rise angle. Angle "c", between the working and second faces at their peripheral intersection point, is the intersection angle, and is equal to angle "d" between the working and second faces at the root of the thread, which is the root angle. It will of course be appreciated that with the thread shape of FIG. 1, in which the working and second faces appear as intersecting straight lines in transverse cross section, the sum of angles a + b + c or a + b + d equals 180 degrees. Finally, direction "R" is the rise direction of the working face.

FIG. 1a shows a modified thread cross-section which provides ease in manufacture; this thread shape includes a small flat portion at both points of intersection between the working and second faces; with such profile, angles "c" and "d" are measured at the points of intersection produced by extending the face lines, as shown.

By way of further definition, the thread direction, when used to describe a female member threaded on a male member from one end of the male member, refers to the direction the female member must be rotated to advance it along the male member in a direction away from said one end of the male member. With right hand thread direction such rotation is clockwise, and with left hand thread direction such rotation is counterclockwise.

In accordance with the broadest aspects of the invention, I provide a male/female threaded assembly with locking capability comprising a cylindrical male member threaded over a first portion of its length with a thread having a working face with a rise angle of from 7 to 25 degrees; a first female member having a cylindrical bore threaded to mate with the thread in the male member, the female member being threaded onto the first portion of the male member's length; and means for applying axial force to the female member tending to cause movement of the female member relative to the male member in the rise direction of said working face. Preferably, the means for applying axial force comprise a second portion of the male member's length threaded with a thread having a working face with a rise angle of from 7 to 25 degrees, the second threaded portion being adjacent to the first threaded portion; a second female member having a cylindrical bore threaded to mate with the thread in the second portion of the male member's length and being threaded onto the second portion of the male member's length in a position axially spaced from the first female member; and means engaging both female members and adapted to simultaneously apply axial force to each female member in the rise direction of the working face in the respective portion of the male member's length carrying such female member.

In accordance with more particularized aspects of the invention, I provide a hub and shaft connection comprising a cylindrical shaft having an end and a first section extending between first and second predetermined points on the shaft, the first section being threaded with a thread having a working face with a rise angle of from 7 to 25 degrees; a first hub having a bore threaded to match the thread in the first section of the shaft, the first hub being threaded onto the first section; and means for applying axial force to the first hub tending to cause movement of said hub relative to the shaft in the rise direction of said working face.

In one embodiment, a second hub, having a bore identical to that of the first hub, is threaded onto the first section of the shaft in a position spaced from the first hub; and the means for applying axial force to the first hub comprise means engaging the first and second hubs and adapted to exert axial force on the first hub in the rise direction of said working face.

In a preferred embodiment, the first predetermined point on the shaft is at the end of the shaft; the shaft has a second section adjacent to the first section and extending between third and fourth predetermined points on the shaft, the second section being threaded with a thread having a working face with a rise angle of from 7 to 25 degrees; the outside diameter of the first section of the shaft is equal to or less than the root diameter of the thread in the second section; a second hub, having a bore threaded to match the thread on the second section of the shaft, is threaded onto the second section; and the means for applying axial force to the first hub comprise means engaging the first and second hubs and adapted to exert axial force on the first hub in the rise direction of the working face in the first section of the shaft.

Preferably the thread direction in one section of the shaft is right hand and the thread direction in the other section of the shaft is left hand.

In an embodiment which I call a tension connection, the rise direction of the working face in the first section of the shaft is away from the shaft end, the rise direction of the working face in the second section of the shaft is toward the shaft end, and the means engaging the first and second hubs exert force tending to pull the hubs toward each other.

In a preferred tension connection, the means engaging the first and second hubs comprise a plurality of threaded bores through one hub and arranged in a circular pattern concentric with but spaced from the shaft, an equal number of non-threaded bores through the other hub axially aligned with said threaded bores, and bolts passing through each of the non-threaded bores and threaded into the corresponding threaded bores, whereby tightening of said bolts results in tension forces tending to pull the first and second hubs toward each other.

In an embodiment which I call a compression connection, the rise direction of the working face in the first section of the shaft is toward the shaft end, the rise direction of the working face in the second section of the shaft is away from the shaft end, and the means engaging the first and second hubs exert force tending to push the hubs away from each other.

In a preferred compression connection, the means engaging the first and second hubs comprise a plurality of threaded bores through one hub arranged in a circular pattern concentric with but spaced from the shaft, and set screws threaded into each of said threaded bores, each set screw having an end extending from the hub through which it is threaded and engaging the other hub, whereby the set screws, when tightened, exert compressive forces tending to separate the two hubs.

The preferred thread shape according to the invention includes a second face rise angle of from 75 to 90 degrees, and in an especially preferred thread configuration the working face rise angle is from 15 to 17 degrees.

Depending on the use to which my invention is put, the number of threads per inch in the first section of the shaft may be the same as or different from that in the second section of the shaft.

Other details, objects and advantages of the invention will become apparent as the following description of certain present preferred embodiments thereof proceeds.

BRIEF DESCRIPTION OF THE DRAWINGS

In the accompanying drawings I have shown certain present preferred embodiments of the invention in which:

FIG. 5 shows a partial cross-sectional view of a tension connection of the invention used to secure a turbine blade wheel to a shaft.

DESCRIPTION OF THE PREFERRED EMBODIMENTS

Figure 1:
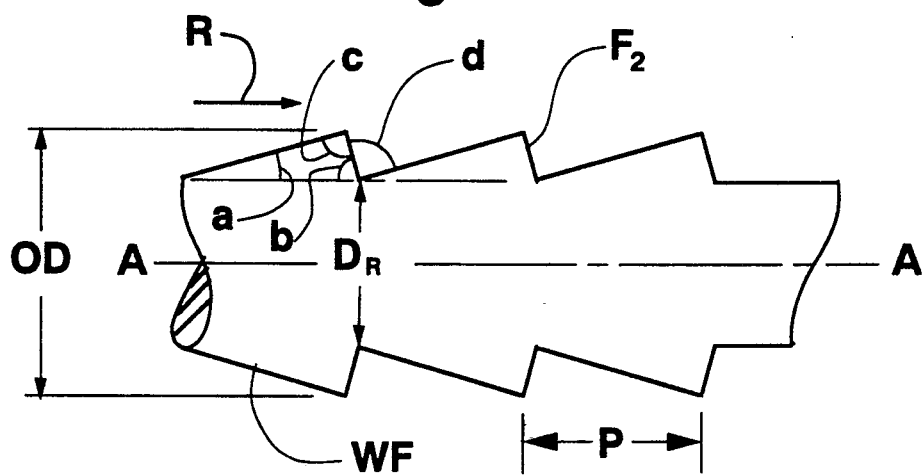
FIGS. 1 and 1a show a simplified partial cross-sectional view of a cylindrical shaft threaded in accordance with the invention, as discussed hereinabove.
Figure 1A:
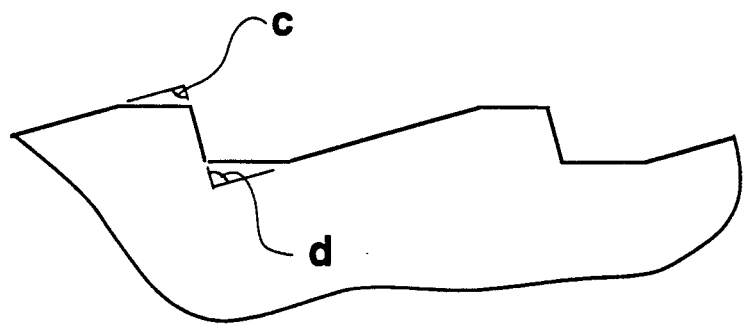
Figure 2:
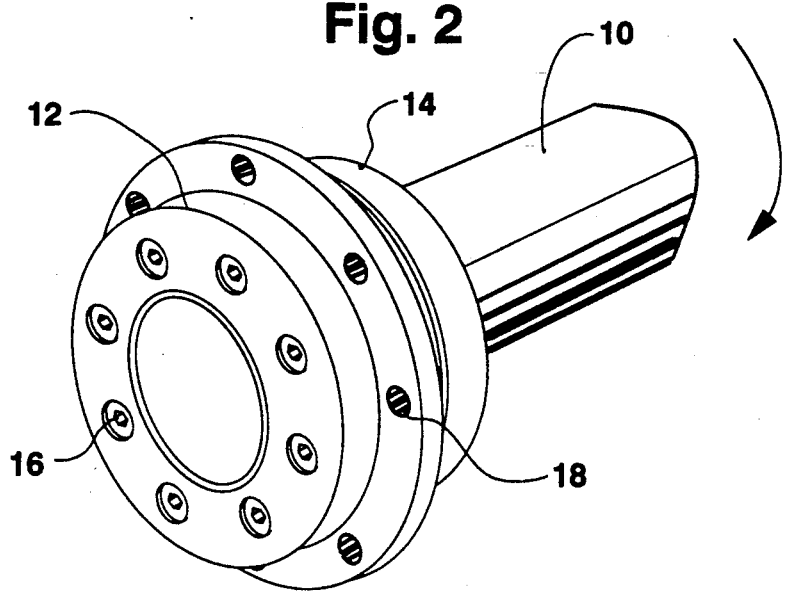
FIG. 2 shows a perspective view of a coupling hub assembly in accordance with the invention.
Figure 3:
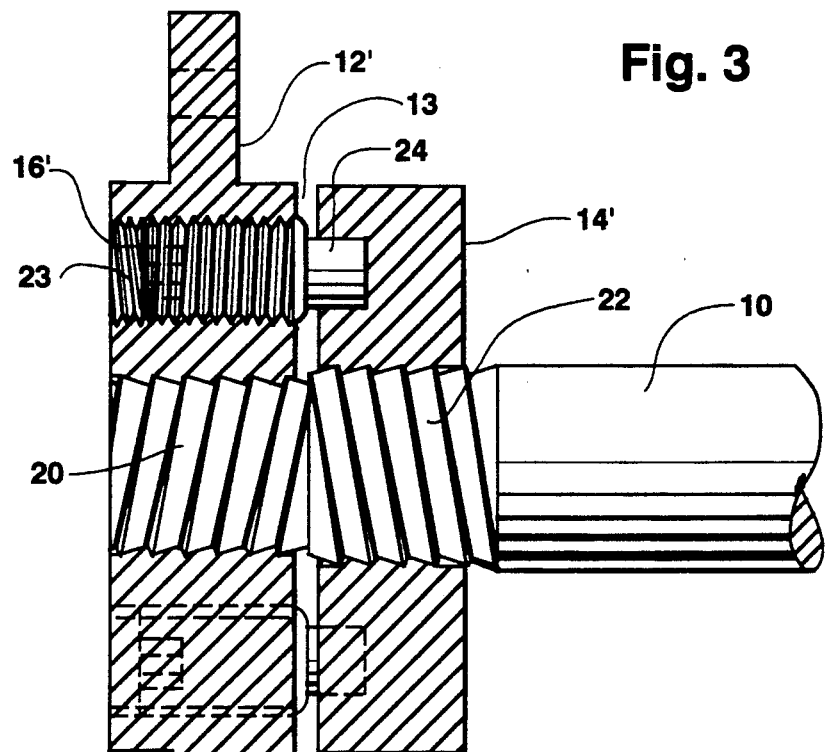
FIG. 3 shows a partial cross-sectional view of the assembly of FIG. 2 configured as a compression connection.
Figure 4:
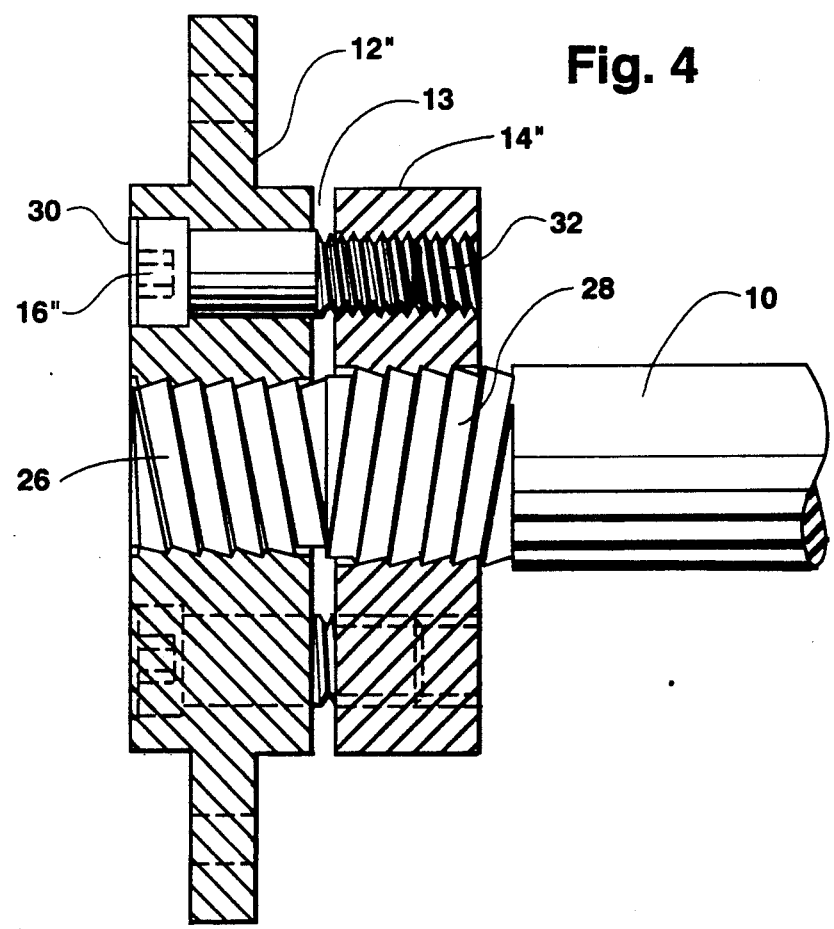
FIG. 4 shows a partial cross-sectional view of the assembly of FIG. 2 configured as a tension connection.

As hereinabove indicated, my invention is particularly useful for coupling hubs that transmit torque from a shaft of one machine to a shaft on another machine with a flexible coupling between. It is also applicable to mounting wheels on shafts, such as turbine wheels transmitting torque from the wheel to the shaft. FIGS. 2, 3 and 4 show a coupling hub connection according to the invention and FIG. 5 shows a turbine wheel mounting arrangement embodying the invention.

The principle on which my invention is based is this: If a cylindrical shaft is threaded with a thread which in profile has a low working face rise angle, and a hub or other member having a threaded cylindrical bore matching the shaft thread is turned onto the shaft, the hub can be locked in position on the shaft by applying axial force to the hub in the rise direction of the thread working face. Such axial force generates friction force between hub and shaft at the working face of the thread; the friction force is a combination of a component produced in the axial direction by the applied axial force and a component produced in the radial direction by the force tending to "stretch" the hub because of the thread taper. When the friction forces become high enough relative to the coefficient of friction of the materials used, the hub becomes locked into position so that torque can be transmitted by the shaft through the hub and vice versa.

In designing assemblies according to the invention, the working face rise angle of the thread must be low enough to enable sufficient friction forces to be generated at practical levels of applied axial force, but not so low as to cause "sticking" (or seizing) of the hub which renders it difficult or impractical to remove when desired. It is also necessary to avoid generating excessively high radial or bursting forces within the hub which could cause catastrophic failure; this too affects the lower limit of the working face rise angle, since at very low rise angles the radial forces produced during tightening of the hub can be increased to very high levels with relatively small increases in axial applied force. For virtually all materials that might be used for connections of the type to which the invention is directed, I have found that such competing factors can best be balanced when the working face rise angle of my invention is between about 7 and about 25 degrees; at angles less than about 7 degrees the thread taper becomes a "sticking" taper—i.e. it becomes difficult to release once the hub is tightened on the shaft. At angles greater than about 25 degrees the taper becomes "non-sticking" —i.e. it becomes impracticable or impossible to generate enough frictional force between hub and shaft to lock the hub on the shaft. However, as the rise angle increases from 7 degrees toward 25 degrees it become progressively easier to loosen the hub for removal. I have found that for connections fabricated from materials having coefficients of friction typical of common machine alloys such as steel (e.g. AISI 4140, etc.), titanium alloys and the like, the optimum working face rise angle is from 15 degrees to 17 degrees, preferably 16 degrees; this angle generally optimizes the forces to allow secure hub locking when tight, easy removal, and safely low levels of bursting stress. With regard to the second face rise angle, although connections in accordance with the invention will function satisfactorily at any of numerous angles, for ease in manufacturing and to avoid having the connection occupy excessive axial shaft length, I prefer to maintain a second face rise angle between 75 and 90 degrees.

Turning now to FIG. 2, a perspective view of a typical coupling hub assembly according to the invention is shown. A cylindrical shaft 10 functions to either drive or be driven by torque applied by or to it. A flanged first coupling hub 12 is threaded onto a first section at the end of shaft 10 and a second hub 14 is threaded onto a second section of the shaft adjacent to the first section. The threads in each section, not shown, have working faces with rise angles from 7 to 25 degrees. Eight fasteners 16, which are bolts for a tension connection and set screws for a compression connection, are shown in place in holes formed in first hub 12 and arranged in a circular pattern concentric with the shaft. Fasteners 16 engage the second hub 14 in a manner dependent on whether the assembly is a tension or compression connection, as will be evident from discussion hereinbelow, and exert axial force on hub 12 in the working face rise direction of the first section of shaft 10, to thereby lock hub 12 in position on shaft 10. With hub 12 locked on shaft 10 suitable fasteners, not shown, can be passed through an outer circular array of holes 18 in the flange 20 to interconnect the hub with a driven or driving member through a flexible coupling or the like.

FIG. 2 depicts the general appearance of the connections of both FIGS. 3 and 4, since externally both may look the same even though FIG. 3 shows a compression and FIG. 4 a tension connection. Accordingly, common elements will be given the same or primed referenced numerals in all three figures.

It should be pointed out that in FIGS. 3 and 4, as well as in FIG. 5, the shapes of the threads according to the invention are exaggerated for clarity.

Turning to FIG. 3, the assembly of FIG. 2 is shown configured as a compression connection according to the invention. Cylindrical shaft 10 has a first section 20 at its end, having formed therein a thread with a working face rise angle of 16 degrees and a rise direction toward the end of the shaft, or to the left viewing FIG.

3. The thread direction in the first section is left hand, although a right hand thread could also be used if desired, provided the rise direction remains as shown in FIG. 3. A second threaded section 22 is adjacent to and inboard of the first section; in section 22 the working face rise angle is also 16 degrees but the rise direction is away from the end of the shaft 10, or the to right viewing FIG. 3, and the thread is right hand. The size relationship between first and second sections 20 and 22 is such that the outside diameter of first section 20 is no greater than the root diameter of second section 22. First and second hubs 12' and 14' have bores threaded respectively to fit first and second sections 20 and 22; because of the diameter differences in the threads of sections 20 and 22, hub 14' can slide past first section 20 to be threaded onto second section 22. Hubs 12' and 14' are threaded onto sections 20 and 22 with a short gap 13 between them. A plurality of fasteners 16', comprising 8 set screws in this embodiment, are then advanced through threaded holes 23 in hub 12' until their ends 24 are received in and bear against the bottoms of recesses formed in hub 14'. Set screws 16' thus engaging both the first hub 12' and the second hub 14', tightening the screws exerts force tending to push the hubs away from each other, i.e. exerts axial force on first hub 12' in the rise direction (left) of the first section 20 of shaft 10. With sufficient tightening of screws 16', frictional forces are generated between both of the hubs and the shaft which effectively lock both hubs against movement vis-à-vis the shaft when torque is applied to the shaft or to the first hub 12'.

To loosen the hubs in FIG. 3 for repositioning or removal, set screws 16' are loosened, thereby removing the axial force from the hubs. Typically such loosening allows the hubs to be turned freely on the shaft; however, if some sticking occurs, e.g. because of a long period of time in the locked condition under applied torque, the hubs can generally be freed by merely tapping each with a hammer in the direction opposite the rise direction, or in the case of FIG. 3 tapping each hub toward the other hub.

FIG. 4 shows the assembly of FIG. 2 configured as a tension connection. A first section 26 of the shaft is threaded with a right hand thread having a working face rise angle of 16 degrees and a rise direction away from the shaft end, and a second shaft section 28 has a left hand thread, also with a working face rise angle of 16 degrees but having a rise direction toward the shaft end. First and second hubs 12" and 14" are mounted on shaft sections 26 and 28 respectively, with a short gap 13 between them; the bores of hubs 12" and 14" are threaded to fit the shaft section on which each is mounted, and the size relationship between the threaded shaft sections 26 and 28 is the same as above described for sections 20 and 22 of FIG. 3.

In FIG. 4 a series of counterbored non-threaded bores 30 is formed in the first hub 12" and a matching series of threaded bores 32 is formed in the second hub 14". Bolts 16" pass through bores 30 and are threaded into bores 32. Tightening of the bolts results in tension forces tending to pull hubs 12" and 14" toward each other, and as in the compression embodiment of FIG. 3, with sufficient tightening of bolts 16" the friction forces generated between the working faces of the threads in shaft sections 26 and 28 and the corresponding faces of the threads in the hub bores lock the hubs in position on the shaft.

Loosening the hubs of FIG. 4 can ordinarily be accomplished by merely loosening the bolts 16" to remove the axial forces acting on the hubs. In the event hub sticking should be encountered with this embodiment, one way of loosening the assembly is to remove bolts 16", insert a pressure plate into the gap between hubs, and turn one or more set screws into the threaded bores 32 from the back of hub 14" (i.e. from the right viewing FIG. 4) until they are tight against the pressure plate; slight additional tightening of the set screws will then force the hubs apart enough to release them for removal.

Although a tension connection functions generally as well as a compression connection in my invention, I prefer to use compression connections because in that configuration only one of the hubs must be bored for the force applying screws; the ends of the compression set screws can simply bear on the face of the other hub, or preferably the other hub can merely be counterbored as shown in FIG. 3 to receive the ends of the screws.

In general I prefer to select thread directions such that the torque applied to the shaft tends to move at least the torque transmitting hub in the direction opposed by the force-applying member—i.e., the torque causes the torque transmitting hub to tighten on the shaft. Where two hubs are utilized, as in FIGS. 2-4, best results are obtained if the thread direction for one hub is opposite that for the other. For example, in FIG. 3 if torque is applied in the direction shown by the arrow in FIG. 2, the thread in shaft section 20 for hub 12' should preferably be left hand (as shown), which will tend to move hub 12' to the right in FIG. 3. Such movement is opposed by the force applying set screws 16', and thus the hub tightens on the shaft. FIG. 3 also shows the thread in shaft section 22 to be right hand—i.e., in the opposite direction from that in section 20; as a result, the torque shown in FIG. 2 tends to move hub 14' to the left, which is also opposed by set screws 16'. Thus the torque applied to shaft 10 has the desirable effect of further tightening both hubs on the shaft.

The following specifications apply to an example of a specific compression connection according to the invention, such as shown generally in FIG. 3; reference numerals of FIG. 3 will be used as applicable:

Shaft (10)—AISI 4140 ($R_c$ 36-40), 1.625 inch O.D.
First threaded section (20): length 0.780 inches, O.D. 1.579 inch
Thread—left-hand, $D_R$ 1.533 inches, 12 threads per inch, working face rise angle 16 degrees, second face rise angle 85 degrees.
Second threaded section (22): length 0.780 inches, O.D. 1.625 inches
Thread—right hand, $D_R$ 1.581 inches, 12 threads per inch, working face rise angle 16 degrees, second face rise angle 85 degrees.
First Hub (12')—AISI 4140 ($R_C$ 28-32)
Axial length 0.82 inches; O.D. at outer flange 5.612 inches, bore threaded to fit first threaded section (20).
Set screw circle—2.5 inches diameter, 12 holes threaded to take ⅜ inch diameter by 24 threads per inch set screws (16').
Second Hub (14')—AISI 4140 ($R_C$ 28-32)
Axial length 0.85 inches; O.D. 3.375 inches, bore threaded to fit second threaded section (22).
Side facing first hub machined with 12 countersunk cavities on 2.5 inch diameter circle to receive ends (24) of set screws (16').

Set Screws—alloy steel, ⅜ inch diameter, 24 threads per inch, ¾ inches long.

The threads on the shaft and in the hub bores were surface ground to produce a design coefficient of friction of 0.30. The set screws were tightened uniformly to produce a calculated total axial force of 78,300 pounds on the hubs.

The above-described assembly can transfer up to about 70,000 pound-inches of torque from the shaft before any slipping will occur between hub and shaft. Assuming a 5x safety factor, the connection can be rated at up to 14,000 pound-inches of torque.

In embodiments of the invention utilizing two hubs or equivalent female members, I prefer to have each hub on a separate threaded section of the shaft, as illustrated in FIGS. 2-5; such construction allows thread direction, working face rise direction, and other thread parameters to be independently chosen for each hub so as to optimize the effectiveness of the assembly. However, the invention also contemplates use of a single threaded shaft section on which both hubs are threaded. With such an embodiment, tightening of the force applying screws or bolts exerts force in the working face rise direction on only one of the hubs, logically the torque transmitting hub (12 in FIGS. 2-4); the forces exerted on the second hub are in the rise direction of the second face, and with the typical second face rise angle of 75 degrees or more, as set forth hereinabove, such axial force will not develop sufficient frictional force to lock the second hub on the shaft. However, the second hub is held in axial position by the threads, and thus provides a firm base for engagement by the force applying screws or bolts; if the friction force generated in the first hub is high enough to satisfactorily lock the hub on the shaft for the particular application, the single thread approach can be used. Obviously, the single-thread embodiment is less costly than the preferred two-threaded, two-diameter embodiment in terms of fabricating the shaft.

Following are additional comments applicable to embodiments of the invention in which two hubs are utilized:

Since the threads can typically be turned on a standard thread cutting lathe (the only special consideration being the unique profile of the threads of my invention), with the shaft centered on the lathe similarly to the way it is centered for turning to its basic diameter, it follows that the threads will be concentric with the shaft axis. Similarly, the threads in the hub or hubs can be turned so as to be concentric with the hub axis. Both factors insure that the hub or hubs are centered on the shaft in the practice of my invention, leaving virtually no change for balance problems associated with eccentricity.

In connections according to the invention diameter tolerances are not nearly so critical as with typical shrink fit methods of the prior art. Because of the thread geometry between hub and shaft, if the diameters are not absolutely accurate the hub will simply ride up higher on the working face of the shaft thread, while still maintaining concentricity with the shaft axis.

A very significant advantage of connections according to the invention is that since they involve threading the hub or other female member onto the shaft or other male member, the axial position of the hub can easily be varied for adjusting the relationship of the hub to the machine or member with which it is connected. After such adjustment the set screws, bolts or other force applying means can be used to tighten the hub on the shaft. In the preferred compression or tension connections such as those shown in FIGS. 2-4, the fineness of possible adjustments can be increased by using smaller or more closely pitched shaft and hub threads or by increasing the number of force applying bolts or set screws in the circular pattern; the former provides shorted axial displacement for a given angular displacement, and the latter allows smaller angular displacement between adjacent holes when holes in the two hubs must be aligned to accommodate the force applying set screws or bolts.

Although in the preferred two hub, two-thread embodiments of my invention I prefer that one of the threads be right hand and the other left hand so that the assembly can be self-tightening under the design torque direction, other combinations are possible. For example, if both threads are in the same direction, right hand or left hand, and have the same pitch, then any excess torque exceeding the friction will merely tend to move the two hubs together along the shaft, the direction depending on which way the torque is applied. In other words, in such case the two hubs will act like a single nut on a bolt, i.e. will not be self-tightening, and the torque capacity will be limited by the friction created solely by the axial force applied to the two hubs. Having like directions in both threaded sections has one advantage in that it is somewhat cheaper to manufacture; accordingly, as long as the friction generated is adequate to carry the applied torque, which could well be the case if rise directions are selected appropriately, this type of mounting would be satisfactory.

A modification of the embodiment in which both threads are the same direction is one where the thread pitch is different between the two threads. For example, if the thread holding one hub is finer than the thread holding the other hub, then excess torque on the hubs will tend to advance both hubs in the same direction but at a different rate; accordingly, one of the hubs would still tend to tighten on the shaft under the application of torque, making the torque carrying capacity greater than if both threads are in the same direction and of the same degree of fineness.

Yet another possible combination of threads is one in which both threads run in the same direction, either right hand or left hand, and the first threaded section of the shaft (e.g. 26 in FIG. 4) is of a smaller diameter than the second or inboard threaded section (e.g. 28 in FIG. 4)—i.e. the shaft diameter relationships shown in the drawing figures herein. In this case, if excessive torque causes slipping, both hubs will move in the same direction; if such movement is away from the shaft end, it will be stopped when the first hub contacts the shoulder between the first and second sections, thereby resulting in tightening of the hubs on the shaft at that point.

As stated hereinabove, my preferred shaft thread profile is similar to that shown in FIGS. 1 and 1a—i.e. an asymmetric thread having a working face rise angle of 7 to 25 degrees and a second face rise angle of 75 to 90 degrees. No prior art threads of which I am aware have such a profile or can be used for the same purposes as assemblies of my invention—i.e. as means to lock a hub on a shaft for transmitting heavy torque loads. Most commonly used prior art threads are symmetrical in profile, i.e. both faces have the same rise angle, and the rise angles utilized are in the 60 degree to 80 degree range, clearly non-sticking and far greater than the 7 to 25 degrees necessary to the practice of my invention.

The prior art does include one asymmetric thread shape known as a buttress thread, in which one face has a 90 degree rise angle and the other a rise angle of about 45 degrees; however, not only is the load-bearing, or working face in these threads the 90 degree face, which obviously could not produce any of the radial frictional forces necessary with my invention, but also the second face rise angle of 45 degrees is still far too great for use in my invention even if such use were contemplated.

Another specialized prior art thread is the Dardelet "self-locking" thread, sometimes used in bolt and nut combinations. Locking capability in this thread is achieved by machining the root of the bolt thread and the crest of the nut thread with a 6 degree rise angle, while the crest of the bolt thread and the root of the nut thread are parallel to the bolt axis. The load-bearing faces of the Dardelet thread have rise angles of 75 ½ degrees. Two factors make this thread unusable in connections according to the invention: first, although the tapered thread root of the Dardelet thread is helpful in providing some locking capability of bolt and nut combinations, if that surface were load-bearing to an extent equal to the working faces of threads of the invention, the 6 degree rise angle, which is a "sticking taper," would cause serious problems with both sticking and the possible generation of excessive radial bursting forces; second, the 75 ½ degree rise angle of the actual load-bearing faces of the Dardelet thread are clearly well above the usable 7 to 25 degree range required in the practice of my invention.

My invention has many uses in addition to its use with coupling hubs such as shown in FIGS. 2-4. For example, FIG. 5 shows a tension connection according to the invention used to secure a turbine wheel to a shaft. In this embodiment, the shaft 40 is threaded similarly to the shaft 10 of FIG. 4; a first section 42 has a right hand thread with a working face rise angle of 16 degrees and a rise direction to the right viewing the figure, and second section 44 has a left hand thread with a working face rise angle of 16 degrees and a rise direction to the left. The thread O.D. in section 42 is equal to or less than the $D_R$ of the thread in section 44. In this embodiment the hubs comprise two disks 46 and 48 threaded respectively onto sections 44 and 42 with a gap between them. At their outer rims the inner faces of disks 46 and 48 are spaced apart and provided with serrations which match serrations in the root 50 of a turbine wheel 52. A first plurality of threaded bolt holes 54 is formed in an outer bolt circle near the periphery of disk 46, and a second plurality of threaded bolt holes 56 is formed in an inner bolt circle near shaft 40. Typically, the outer bolt circle can accommodate 24 or more bolts and the inner circle can accommodate 8 to 12 bolts. Disk 48 includes two sets of counterbored non-threaded bolt holes 58 and 60 equal in number and spacing respectively to threaded holes 54 and 56 in disk 46.

In assembling the connection of FIG. 5, disk 46 is first threaded onto shaft section 44, after which the root 50 of turbine wheel 52 is positioned against the serrated face of disk 46. Disk 48 is then threaded onto shaft section 42 until its serrated face is in contact with the other serrated side of the turbine wheel root 50. Next, bolts 62 are inserted through holes 58 in disk 48 and threaded into holes 54, after which they are tightened to firmly secure the turbine wheel between the disks. Finally, tension bolts 64 are inserted through holes 60, threaded into holes 56 and tightened as necessary to lock both disks on shaft 40 in accordance with the invention.

Connections according to the invention are particularly attractive for use as turbine wheel connections such as shown in FIG. 5, because they have virtually no problems with eccentricity, which could be disastrous at the high shaft rotation rates encountered in many turbines.

Other applications of my invention will be readily apparent to those skilled in the art. For example, the invention could find use in an application where a bolt and nut are used to hold together two other members; in such case, the force applying means would comprise the resistance of the members against which the nut and bolt bear under the influence of a wrench or the like.

In summary, threaded assemblies according to the invention have the following listed advantageous features:

1. Assembly and disassembly of the connections can be accomplished with common tools such as wrenches.
2. The invention provides axial adjustability to correct for lengths between machines, eliminating the need for carefully positioning the machines axially and/or using shims to get final length adjustment.
3. Economies can be realized in production since the threaded shafts can be formed on the same lathe as is used to generate the shaft O.D., and no additional setup is required for keyway cutting.
4. Unbalance problems attributable to keys are eliminated.
5. Keyways and splines are eliminated and there are no keys that must be cut and fit; this also provides economies in production.
6. The problems inherent in shrink fitting, including special tooling, heaters and possible safety problems, all of which increase installation cost, are eliminated.
7. With appropriate threading, hubs according to the invention can withstand torque reversals.
8. Hubs are rotationally adjustable on the shaft, making it easier to match orientation between driving and driven shafts.
9. With the rise angle in the required range, seizure of hubs is prevented and release can be effected with minimal force.
10. Shaft ends can be stronger because with the invention there are virtually no stress concentrations in either the hub or shaft.
11. Machining tolerances are less critical than on cylindrical or tapered shaft ends.
12. Because of the simplicity or construction, shafts according to the invention can be smaller than those required for equivalent keyed shafts.
13. Hub yielding problems encountered with hydraulic dilation applications are eliminated, as are possible safety problems associated with leaks in high pressure hydraulic fitting systems.

While I have shown and described certain present preferred embodiments of the invention, it is to be distinctly understood that the invention is not limited thereto, but may be otherwise variously embodied within the scope of the following claims:

I claim:

1. A male/female threaded assembly with locking capability comprising:

a. a cylindrical male member threaded over a first portion of its length with a thread having a working face with a rise angle of from 7 to 25 degrees;

b. a female member, having a threaded cylindrical bore that mates with the thread in the male member and being threaded onto the first portion of the male member's length to an axial location at which the female member is free for clockwise or counterclockwise rotation and corresponding axial movement along said first portion; and c. means for applying axial force to the female member tending to cause movement of the female member relative to the male member in the rise direction of said working face.

2. A hub and shaft connection comprising:

a. a cylindrical shaft having an end and a first section extending between first and second predetermined points on the shaft, the first section being threaded with a thread having a working face with a rise angle of from 7 to 25 degrees;

b. a hub having a bore threaded to match the thread on the first section of the shaft and being threaded onto the first section to an axial location at which the hub is free for clockwise or counterclockwise rotation and corresponding axial movement along said first section; and c. means for applying axial force to the first hub tending to cause movement of said hub relative to the shaft in the rise direction of said working face.

3. A male/female threaded assembly with locking capability comprising:

a. a cylindrical male member threaded over a first portion of its length with a thread having a working face with a rise angle of from 7 to 25 degrees;

b. a first female member having a cylindrical bore threaded to mate with the thread in the male member, the first female member being threaded onto the first portion of the male member's length; and c. means for applying axial force to the first female member tending to cause movement of the first female member relative to the male member in the rise direction of said working face, said means comprising:

i. a second portion of the male member's length threaded with a thread having a working face with a rise angle of from 7 to 25 degrees, the second threaded portion being adjacent to the first threaded portion;

ii. a second female member having a cylindrical bore threaded to mate with the thread on the second portion of the male member's length and being threaded onto the second portion of the male member's length in a position axially spaced from the first female member; and iii. means engaging both female members and adapted to simultaneously apply axial force to each female member in the rise direction of the working face in the respective portion of the male member's length carrying such female member.

4. A hub and shaft connection comprising:

a. a cylindrical shaft having an end and a first section extending between first and second predetermined points on the shaft, the first section being threaded with a thread having a working face with a rise angle of from 7 to 25 degrees;

b. a first hub having a bore threaded to match the thread on the first section of the shaft, the first hub being threaded onto the first section;

c. a second hub having a bore identical to that of the first hub and being threaded onto the first section of the shaft in a position spaced from the first hub; and d. means for applying axial force to the first hub tending to cause movement of said hub relative to the shaft in the rise direction of said working face, said means comprising means engaging the first and second hubs and adapted to exert axial forces on the first hub in the rise direction of said working face.

5. A hub and shaft connection comprising:

a. a cylindrical shaft having an end, a first section extending between the end and a first predetermined point on the shaft, and a second section adjacent to the first section and extending between second and third predetermined points on the shaft, the first and second sections each being threaded with a thread having a working face with a rise angle of from 7 to 25 degrees, the outside diameter of the first section being equal to or less than the root diameter of the thread in the second section;

b. a first hub having a bore threaded to match the thread on the first section of the shaft and being threaded onto the first section;

c. a second hub having a bore threaded to match the thread on the second section of the shaft, and being threaded onto the second section; and d. means for applying axial force to the first hub tending to cause movement of said hub relative to the shaft in the rise direction of said working face, said means comprising means engaging the first and second hubs and adapted to exert axial force on the first hub in the rise direction of the working face in the first section of the shaft.

6. A connection as claimed in claim 5 in which the thread direction in one section of the shaft is right hand and the thread direction in the other section of the shaft is left hand.

7. A connection as claimed in claim 6 in which the rise direction of the working face in the first section of the shaft is away from the shaft end, the rise direction of the working face in the second section of the shaft is toward the shaft end, and the means engaging the first and second hubs exert force tending to pull the hubs toward each other.

8. A connection as claimed in claim 7 in which the means engaging the first and second hubs comprise a plurality of threaded bores through one hub and arranged in a circular pattern concentric with but spaced from the shaft, an equal number of non-threaded bores through the other hub axially aligned with said threaded bores, and bolts passing through each of the non-threaded bores and threaded into the corresponding threaded bores, whereby tightening of said bolts results in tension forces tending to pull the first and second hubs together.

9. A connection as claimed in claim 6 in which the rise direction of the working face in the first section of the shaft is toward the shaft end, the rise direction of the working face in the second section of the shaft is away from the shaft end, and the means engaging the first and second hubs exert force tending to push the hubs away from each other.

10. A connection as claimed in claim 9 in which the means engaging the first and second hubs comprise a plurality of threaded bores through one hub arranged in a circular pattern concentric with but spaced from the shaft, and set screws threaded into each of said threaded bores, each set screw having an end extending from the hub through which it is threaded and engaging the other hub, whereby the set screws, when tightened, exert compressive forces tending to separate the two hubs.

11. A connection as claimed in any of claim 5 through 10 in which each of the threads in the first and second sections of the shaft has a second face rise angle of from 75 to 90 degrees.

12. A connection as claimed in claim 11 in which the working face rise angle of each thread is from 15 to 17 degrees.

13. A connection as claimed in claim 12 in which the number of threads per inch in the first section of the shaft is different from that in the second section of the shaft.

* * * * *